(12) United States Patent
Hoobler

(10) Patent No.: US 7,130,337 B2
(45) Date of Patent: Oct. 31, 2006

(54) METHOD AND SYSTEM FOR SAMPLE AND RECREATION SYNCHRONIZATION FOR DIGITAL TRANSMISSION OF ANALOG MODEM SIGNAL

(75) Inventor: Ryan Hoobler, West Valley City, UT (US)

(73) Assignee: Phonex Broadband Corporation, Midvale, UT (US)

( * ) Notice: Subject to any disclaimer, the term of this patent is extended or adjusted under 35 U.S.C. 154(b) by 670 days.

(21) Appl. No.: 09/898,295

(22) Filed: Jul. 2, 2001

(65) Prior Publication Data

US 2003/0002572 A1 Jan. 2, 2003

(51) Int. Cl.
*H04B 1/38* (2006.01)

(52) U.S. Cl. ............... 375/222; 375/251; 375/216; 375/377; 370/294; 455/402; 455/557

(58) Field of Classification Search ............ 375/222, 375/229, 267, 373, 251, 377, 216; 370/294, 370/493; 455/402, 557

See application file for complete search history.

(56) References Cited

U.S. PATENT DOCUMENTS

| | | | |
|---|---|---|---|
| 4,059,800 A | 11/1977 | Jones, Jr. ................. | 370/202 |
| 4,121,217 A | 10/1978 | Chen ...................... | 370/535 |
| 4,264,974 A | 4/1981 | Crouse .................... | 375/251 |
| 4,876,696 A | 10/1989 | Yoshikawa ............... | 375/216 |
| 4,910,610 A | 3/1990 | Utsugi .................... | 358/435 |
| 4,914,689 A | 4/1990 | Quade et al. ............. | 379/142 |
| 5,023,906 A | 6/1991 | Novas ..................... | 379/372 |
| 5,119,375 A | 6/1992 | Paneth et al. ............ | 370/345 |
| 5,123,033 A | 6/1992 | Beck ...................... | 375/377 |
| 5,127,041 A | 6/1992 | O'Sullivan ............... | 455/557 |
| 5,151,923 A | 9/1992 | Fujiwara ................. | 375/216 |
| 5,175,617 A | 12/1992 | Wallace et al. ........... | 348/384 |
| 5,259,000 A | 11/1993 | Kojima et al. ............ | 375/222 |
| 5,265,127 A | 11/1993 | Betts et al. .............. | 375/265 |
| 5,278,865 A * | 1/1994 | Amrany et al. ........... | 375/222 |
| 5,291,484 A | 3/1994 | Tomita et al. ............ | 370/384 |
| 5,305,384 A | 4/1994 | Ashby et al. ............. | 380/29 |
| 5,323,398 A | 6/1994 | Wake et al. .............. | 358/434 |
| 5,325,425 A | 6/1994 | Novas et al. ............. | 379/100 |
| 5,337,348 A * | 8/1994 | Yamazaki et al. ......... | 370/294 |
| 5,343,500 A | 8/1994 | Betts et al. .............. | 375/262 |
| 5,467,353 A | 11/1995 | Fukada ................... | 370/524 |
| 5,481,567 A | 1/1996 | Betts et al. .............. | 375/261 |
| 5,506,871 A | 4/1996 | Hwang et al. ............ | 375/230 |
| 5,521,967 A | 5/1996 | Novas et al. ............. | 379/100.14 |
| 5,528,625 A | 6/1996 | Ayanoglu et al. ......... | 375/222 |
| 5,598,401 A | 1/1997 | Blackwell et al. ......... | 379/94 |
| 5,657,358 A | 8/1997 | Panech et al. ........... | 375/356 |
| 5,671,251 A | 9/1997 | Blackwell et al. ......... | 375/222 |
| 5,687,194 A | 11/1997 | Paneth et al. ............ | 375/283 |
| 5,734,678 A | 3/1998 | Paneth et al. ............ | 375/240 |
| 5,774,530 A | 6/1998 | Montgomery et al. ..... | 379/112 |
| 5,809,120 A | 9/1998 | Montgomery et al. ..... | 379/113 |

(Continued)

*Primary Examiner*—Chieh M. Fan
*Assistant Examiner*—Eva Zheng
(74) *Attorney, Agent, or Firm*—Snell & Wilmer L.L.P.

(57) ABSTRACT

A method and system for the synchronization of the transmission of digitally converted analog modem signals between two or more modems using either RF over-the-air or A/C power line communication channels. This invention provides for modem speed optimization my minimizing or eliminating clock variance between the modems in a digital communication system. A fixed delay is created and maintained during modem operation. This invention is also adapted to function in a full-duplex communication system maintaining a fixed delay in both directions.

4 Claims, 2 Drawing Sheets

U.S. PATENT DOCUMENTS

| | | | |
|---|---|---|---|
| 5,815,505 A | 9/1998 | Mills | 370/522 |
| 5,842,125 A | 11/1998 | Modzelesky et al. | 455/426 |
| 5,854,835 A | 12/1998 | Montgomery et al. | 379/119 |
| 5,896,369 A | 4/1999 | Warsta et al. | 370/338 |
| 5,926,745 A | 7/1999 | Threadgill et al. | 455/12.1 |
| 5,999,898 A | 12/1999 | Richter | 704/217 |
| 6,002,684 A | 12/1999 | McVerry | 370/359 |
| 6,014,374 A | 1/2000 | Paneth et al. | 370/345 |
| 6,055,245 A | 4/2000 | Mitchell et al. | 370/493 |
| 6,243,571 B1 * | 6/2001 | Bullock et al. | 455/402 |
| 6,320,941 B1 * | 11/2001 | Tyroler | 379/93.24 |
| 6,370,188 B1 * | 4/2002 | Wu et al. | 375/222 |

* cited by examiner

METHOD AND SYSTEM FOR SAMPLE AND RECREATION SYNCHRONIZATION FOR DIGITAL TRANSMISSION OF ANALOG MODEM SIGNAL

BACKGROUND OF INVENTION

1. Field of the Invention

This invention relates to methods and systems for modem synchronization in communications systems. More specifically, this invention relates to methods and systems for modem synchronization in which the traditional analog signal is sampled, digitized and recreated.

2. Description of Related Art

A variety of modem communications processes and systems have been described in the art. Generally, these prior processes and systems either employ exclusively analog processes or fail to account for and correct the delay induced in the system by the analog-to-digital and digital-to-analog conversions.

The reader is referred to the following U.S. patent documents for general background material. Each of these patents is hereby incorporated by reference in its entirety for the material contained therein.

U.S. Pat. No. 4,059,800 describes a companded digital delta modulator which can encode both voice and voice band modem signals over a wide range of input levels.

U.S. Pat. No. 4,121,217 describes a data transmission network having an improved interface unit for matching the network to local subscriber loops.

U.S. Pat. No. 4,264,974 describes a digital delta modulation compander circuit that makes advantageous use of the mathematical truncation created during computation of step sizes to create a non-linear step size variation which differs from the optimum desired step size but causes convergence recovery during error conditions.

U.S. Pat. No. 4,876,696 describes a transmission system for transmitting modem signals or multifrequency signals together with speech signals over the same digital transmission line.

U.S. Pat. No. 4,910,610 describes a facsimile communication system where four channels of group 3 facsimile signals are transmitted through a digital transmission line of Bearer rate 64 Kbits/s for a speech signal.

U.S. Pat. No. 4,914,689 describes a reverse automatic number identification system, which allows the called party in a telephone line to identify the telephone directory number of the calling party.

U.S. Pat. No. 5,023,906 describes a call progress monitor and algorithm for placing a phone call over the phone lines.

U.S. Pat. No. 5,119,375 describes a system and method for the wireless transmission of information signals between a base station and a plurality of subscriber stations.

U.S. Pat. No. 5,123,033 describes a transmitted modem signal, having an original symbol rate which has been demodulated for digital transmission, that is recovered at a network receiver by obtaining an estimate of error between the original transmitted symbol rate and a known nominal symbol rate.

U.S. Pat. No. 5,127,041 describes a system for connecting a computer to both cellular and landline telephone systems.

U.S. Pat. No. 5,151,923 describes a voice frequency communication apparatus which is capable of detecting and processing the voice frequency terminal signal and non-voice frequency terminal signal and is also capable of realizing communication with ordinary voice frequency terminal signal and non-voice frequency terminal signal without erroneous changeover of the signal processing path.

U.S. Pat. No. 5,175,617 describes a system and method is provided to transmit logmap video images through telephone line band-limited analog channels.

U.S. Pat. No. 5,259,000 describes a modem having a modulation and demodulation circuits and a circuit for controlling the modulation and demodulation.

U.S. Pat. No. 5,265,127 describes a non-linear encoder and decoder for information transmission through non-linear channels to mitigate against the multiplicative noise effects caused by known non-linearities in a trellis coded data transmission system.

U.S. Pat. No. 5,291,484 describes a relay and exchange system that includes a plurality of exchanges for relaying and exchanging transmission information contained in frames each composed of m bits, and are so constructed as to form a tandem connection by a plurality of transmission lines.

U.S. Pat. No. 5,305,384 describes an encryption/decryption device, system and method for providing secure communication over a communication channel.

U.S. Pat. No. 5,323,398 describes a speech signal coding system that includes a speech signal encoder for dividing received speech signals into a plurality of frames each having a predetermined time interval and for converting the speech signals into digital speech parameters.

U.S. Pat. No. 5,325,425 describes a call progress monitor and algorithm for placing a telephone call over the telephone lines.

U.S. Pat. No. 5,343,500 describes a non-linear encoder and decoder for information transmission through non-linear channels used to mitigate against the multiplicative noise effects caused by known non-linearities in a trellis coded data transmission system.

U.S. Pat. No. 5,467,353 describes a substrate control channel exchange system that uses a part of bits in a control channel time slot.

U.S. Pat. No. 5,481,567 describes an improvement over existing techniques for transmitting data over voice-band telephone channels by automatically adapting the amount of warping or compression that is applied to a sequence of signal points.

U.S. Pat. No. 5,506,871 describes an adaptive equalizing system that equalizes an unequaled signal and performs carrier recovery for use in a digital communication receiver.

U.S. Pat. No. 5,521,967 describes a call progress monitor and algorithm for placing a telephone call over the telephone lines, that is hierarchically arranged having three major routines or portions: tone detection, signal recognition and situation recognition.

U.S. Pat. No. 5,528,625 describes a quantization-level-sampling modem, which includes a means for separately equalizing each loop of an end-to-end digital telephone system network connection by employing a plurality of transmitter filters and a plurality of receiver filters.

U.S. Pat. Nos. 5,598,401, 5,671,251 describe an apparatus and method for a data communications device to selectively operate in a plurality of analog and digital modes, including as an analog modem, as a digital modem, and as a terminal adapter.

U.S. Pat. No. 5,657,358 describes a toll quality terrestrial wireless digital multiple access terrestrial communication system is disclosed having a base station in communication with telephone lines and with mobile subscriber stations.

U.S. Pat. No. 5,687,194 describes a system for the wireless transmission of multiple information signals utilizing digital time division circuits between a base station and a plurality of subscriber stations.

U.S. Pat. No. 5,734,678 describes a terrestrial RF telephone system that provides a plurality of voice signal channels on a plurality of forward direction carrier frequencies, each carrier frequency having an associated predetermined bandwidth, which is designed to accommodate one analog voice signal, and each carrier frequency containing a plurality of slots.

U.S. Pat. Nos. 5,774,530 and 5,809,120 describe a system and method for using underused or unused local telephone company local loops to subscriber premises for providing to such premises a connection to an alternate service provider.

U.S. Pat. No. 5,815,505 describes a communication device, which is configured to provide selective signal processing at a "plain old telephone service" (POTS) interface, an ISDN U interface, or an ISDN S/T interface.

U.S. Pat. No. 5,842,125 describes a mobile satellite system that includes a satellite communication switching office and network system having a satellite antenna for receiving and transmitting a satellite message via a satellite to and from a mobile earth station including a mobile communication system, a satellite interface system, a central controller receiving and transmitting the satellite message from the mobile earth station to and from the satellite communication switching office via the satellite and the satellite interface system.

U.S. Pat. No. 5,854,835 describes a system and method for using underused or unused local telephone company local loops to subscriber premises for providing to such premises a connection to an alternate service provider having a common channel signaling controlled switched network.

U.S. Pat. No. 5,896,369 describes a mobile communication system and method for connecting a remote workstation to a data network via a mobile communication network.

U.S. Pat. No. 5,926,745 describes a mobile satellite system that includes a satellite communication switching office and network system having a satellite antenna for receiving and transmitting a satellite message via a satellite to and from a mobile earth station.

U.S. Pat. No. 5,999,898 describes a method and apparatus for discriminating between voice and voiceband data in an input signal from a voiceband channel, which is available by blocks of samples.

U.S. Pat. No. 6,002,684 describes a smart subscriber line interface card that includes a switch coupled to a data transmitter, a DAC, and a controller circuit.

U.S. Pat. No. 6,014,374 describes a telecommunication system for processing a plurality of simultaneous bi-directional communications, that includes a primary station and at least one secondary station using wireless transmissions over one of a plurality of available RF carrier frequencies.

U.S. Pat. No. 6,055,245 describes an apparatus and method for facilitating interaction during a communication session between an analog modem and a terminal adapter for conveying digital alert tones and control data there between.

SUMMARY OF THE INVENTION

It is desirable to provide a method and system for maintaining synchronization between analog modems which are used in an RF or AC power line carrier channel. It is particularly desirable to provide a method and system for maintaining synchronization in analog modem communication channels where the modem signals are sampled and digitized then recreated as an analog signal.

Accordingly, it is an object of this invention to provide a method and system for the synchronization of sampled analog modem signals.

Another object of this invention is to provide a method and system for maintaining a constant delay during modem operation between both the base to extension communication path and the extension to base communication path.

A further object of this invention is to provide a method and system for the synchronization of analog modem signals where the modem signals are sampled and digitized.

A still further object of this invention is to provide a method and system for the synchronization of analog modem signals that operates on either an RF or Power Line communication channel.

It is another object of this invention to provide a method and system for the synchronization of analog modem signals that works to maintain high data rates by synchronization of the clock signals.

It is a further object of this invention to provide a method and system for the synchronization of analog modem signals that maintains the synchronization between a plurality of modems in both directions.

It is a still further object of this invention to provide a method and system for the synchronization of analog modem signals that maintains constant delay between a base and an extension unit.

Another objects, advantages and other novel features of this invention will be set forth in part in the description that follows and in part will become apparent to those skilled in the art upon examination of the following or may be learned with the practice of the invention. The objects and advantages of this invention may be realized and attained by means of the instrumentalities and combinations particularly pointed out in the appended claims. Still other objects of the present invention will become readily apparent to those skilled in the art from the following description wherein there is shown and described the preferred embodiment of this invention, simply by way of illustration of the best modes known to the inventors to carry out this invention. As it will be realized, this invention is capable of other different embodiments, and in its details and specific circuits; it is capable of modification in various aspects without departing from the concept of this invention. Accordingly, the objects, drawings, and descriptions should be regarded as illustrative in nature and not as restrictive.

BRIEF DESCRIPTION OF THE DRAWINGS

The accompanying drawings incorporated in and forming a part of the specification, illustrate a preferred embodiment of the present invention. Some, although not all, alternative embodiments are described in the following description. In the drawings.

Figure 1:
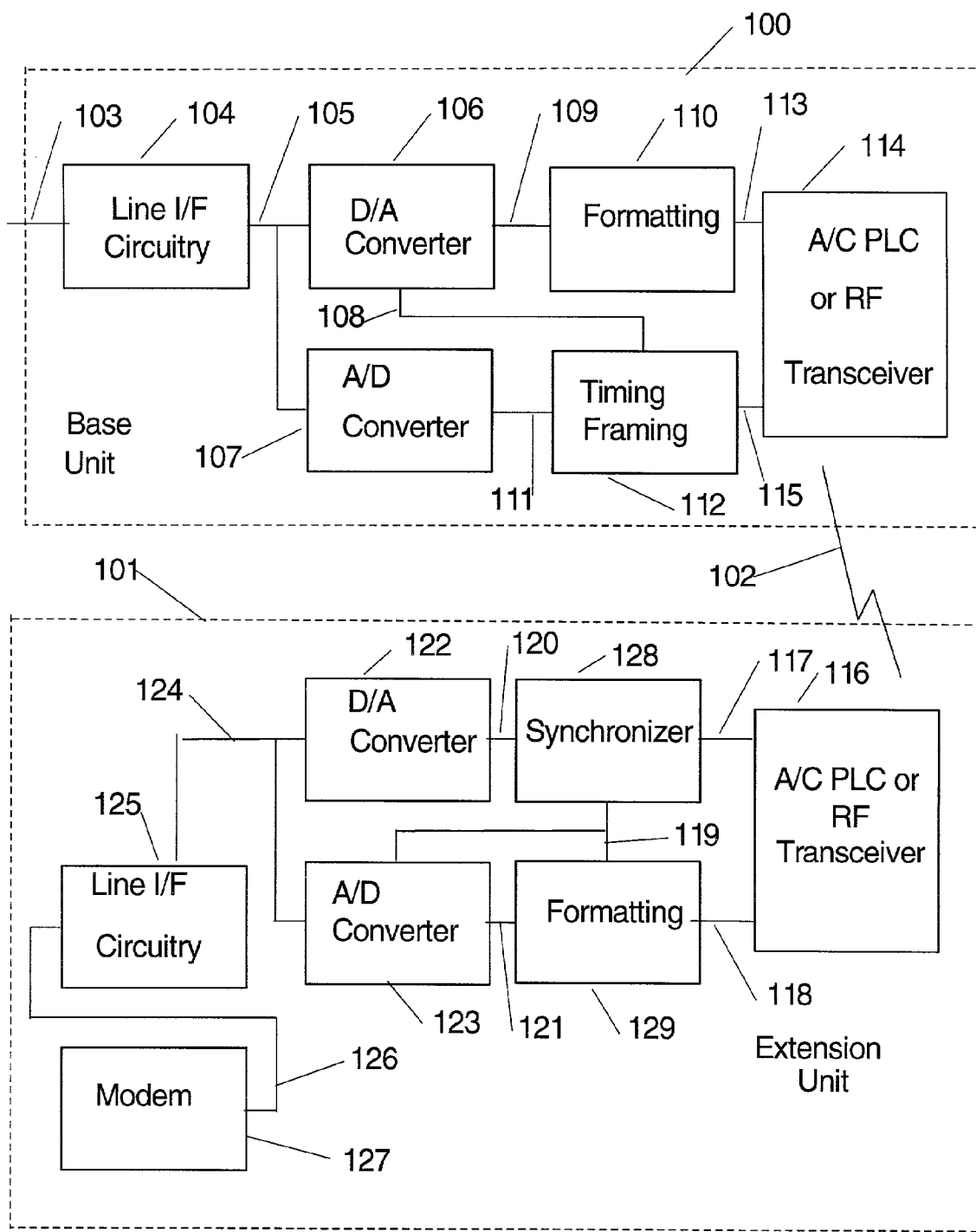
FIG. 1 is a block diagram of the preferred embodiment of this invention.

Reference will now be made in detail to the present preferred embodiment of the invention, an example of which is illustrated in the accompanying drawings.

DETAILED DESCRIPTION

This invention is a method and system for the synchronization of the digital transmission of analog modem signals. Analog modems require a fixed amount of delay time for modem-to-modem communication. If the modem signal is sampled and digitized, using an analog to digital converter (ADC), and then recreated through a digital to analog converter (DAC), the delay from the time when the original signal was sampled to when the signal was recreated must be kept constant for optimal communication. If the delay is not held constant V90 modems will reduce the data transfer rate, thereby lowering communication efficiency. Keeping the delay constant is fairly straightforward if the same clock is available to both the ADC and the DAC. However, when the communication signal is transmitted by use of Radio Frequency (RF) or Power Line Carrier (PLC) the drift of the sample clock and the recreation clock will cause a variation in the communication system delay. Again, in order to maintain high data rates the sample clock and the recreation clock have to be synchronized.

The synchronization should be maintained between the two communicating modems in both directions. Therefore, the transmission from a base unit (the first modem) to an extension unit (the second modem) should maintain constant delay and the transmission from an extension unit (the second modem) to a base unit (the first modem) should maintain constant delay. While the initial delay will vary due to the range, or communication distance, of the modem-to-modem channel, during the operation of the modem, the delay should not vary or the modem speed will be degraded. Maintaining this communication delay constant is a key in maintaining high modem speeds.

The fundamental concept behind this invention is that the ADC samples the signal and initiates the transfer when the receiver receives the data. The DAC then recreates the signal a fixed time later. Since the recreation clock is determined, in this invention, by the sample clock the two (the ADC and the DAC) will have been synchronized and a fixed delay will have been established. If the communication system is a full-duplex system the recovered recreation clock can be used as the sample clock and the sampled data transmitted back. Since the two sample clocks and the two recreation clocks of this invention depend on each other, a fixed clock delay is maintained in both directions.

One preferred technique for synchronizing the sample and recreation clocks is to generate the recreation clock from the received start bit of an asynchronous data transmission. The start bit is detected and the recreation clock is generated. The data word following the start bit is serially received from the transmission medium and is sent serially to the DAC or is stored and sent a specified number of cycles later. While the data is being sent to the DAC, data can be read in from the ADC and transmitted via the return path for a full duplex communication system.

FIG. 1 shows the block diagram of the preferred embodiment of this invention. The base unit 100 is shown in wireless communication 102 with an extension unit 101. The preferred wireless communication channel 102 is either RF over the air or PLC over standard AC power lines. The signal 103 from a modem, typically from a central office, is received by the Line Interface Circuitry 104 of the base unit 100. The output 105 of the Line Interface Circuitry 104 is provided to an Analog-to-Digital (A/D) Converter 107 which converts the received output 105 of the Line Interface Circuitry 104 from an analog signal to a digital signal. The produced digital signal 111 is then provided to the Timing/Framing Circuit 112. The Timing/Framing Circuit 112 sets up the timing 115 for the communication system, by framing the data to be transmitted and sending a start bit, or other similar synchronizing bit that is tied to the framing of the data to be sent to the extension unit 101. This timing information 112 is also is also sent to the Digital-to-Analog (D/A) Converter 106 in the base unit 100 for synchronizing of the incoming data from the extension unit 101 or the return path. The timing pulse or start bit along with the digital data 115 that is framed for transmission is fed to the A/C Power Line Carrier (PLC) transceiver or, alternatively, RF transceiver 114 and is sent to the extension unit 101 A/C PLC or RF transceiver 116, where the received digital signal 117 is provided to the Synchronizer 128. The Synchronizer 128 uses the start bit or synchronizing pulse to time align the framed data in order to establish the constant delay required for high modem speeds. This aligned digital frame of data 120 is sent to the D/A Converter 122, where the digital frame is converted back to an analog formatted data signal 124. The analog formatted data signal 124 is provided to the extension unit 101 Line Interface Circuitry 125, which in turn provides the desired signal 126 to the user's modem 127.

The return path starts with the user's modem 127, passes through the extension unit 101 Line Interface Circuitry 125 outputting an analog data signal 124. The Analog data signal 124 is provided to the extension unit 101 A/D converter 123 producing a digital data signal 121. The A/D converter 123 is time aligned by the Synchronizer 128 and the digital data signal 121 is formatted by the Formatting Circuit 129 and is transmitted to the base unit 100 using either RF or AC PLC transceivers 116 of the extension unit 101. The transmitted signal 102 is received by the base unit RF or AC PLC transceivers 114. The received digital data 113 is formatted by the base unit 100 Formatter 110, which generates a formatted digital signal 109 for the D/A Converter 106. The D/A Converter 106 is already synchronized in time by the Timing Framing Circuit 112.

This system provides synchronized communication from the user modem 127 to other modems through the wireless RF or A/C PLC channel with constant delay while in use. Thereby providing optimal modem speeds with minimal transfer speed degradation compared to the prior techniques of direct connection of the modems through the central office.

Figure 2:
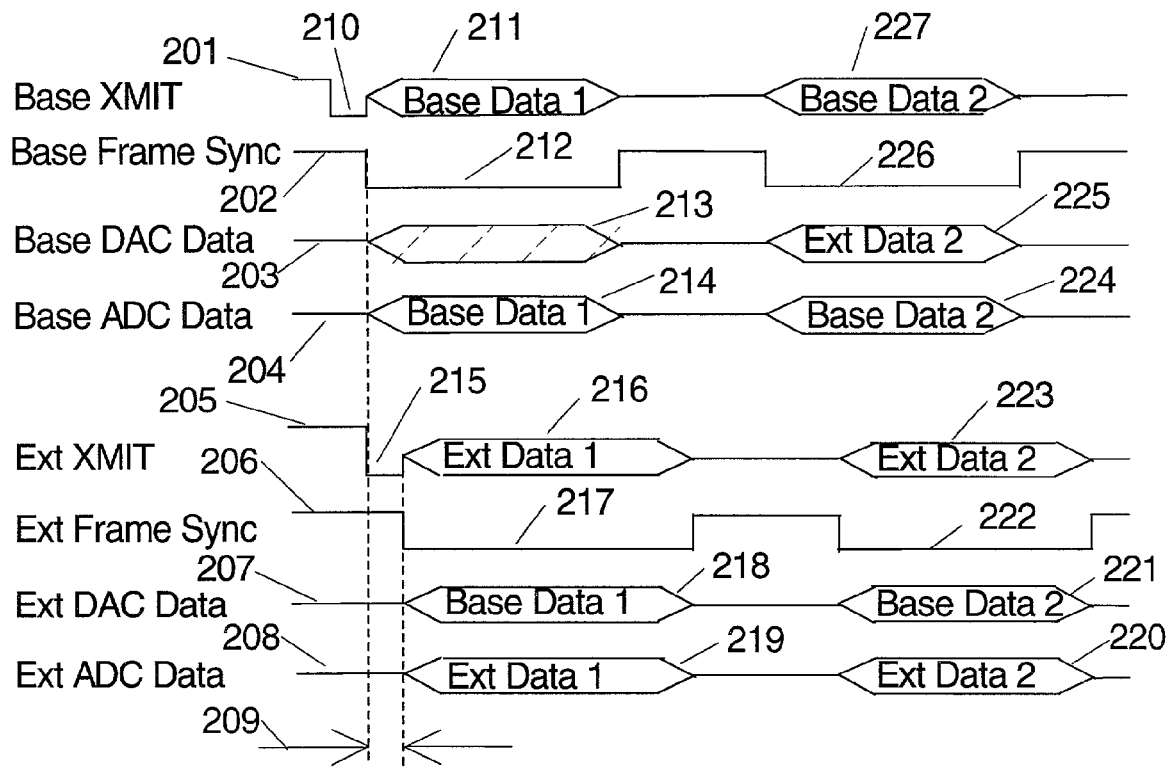
FIG. 2 is a sample and recreation timing diagram of the preferred embodiment of this invention.

FIG. 2 shows the sample and recreation timing diagram of the preferred embodiment of this invention. The Base XMIT 201 signal initiates the process with a start bit 210 followed by the Base Data 1 211. The Base Data 1 211 is framed 212, shown as the Base Frame Sync 202. The Base DAC Data 203 is shown 213 within the frame 212. Base ADC Data 204 tracks 214 the Base Data 1 211. The Extension XMIT 215 signal has a constant time period 209 delay 215 after which the Extension Data 1 216 is received. The Extension Data 1 216 is framed 217, shown in the Ext Frame Sync signal 206. The Ext DAC Data 207 shows the Base Data 1 218 within the frame 217. Ext ADC Data 208 is shown tracking 219 the Base Data 1 218. A second frame of Base Data 227 is shown being framed 226, D/A converted 225 and A/D converted 224. It is then transmitted to the extension unit becoming Ext Data 2 223, which is framed 222 as Base Data 2 221, which is tracked as Ext Data 2 220, maintaining the same constant delay 209.

The previously described preferred embodiment of this invention is to be considered in all respects only as illustrative and not as restrictive. Although the embodiment shown here describes specific data and signal relationships, the invention is no limited thereto. The scope of this invention is indicated by the appended claims rather than by the foregoing description of the present preferred embodiment of this invention. All methods and/or systems, which come directly within the claims or within the meaning and range of equivalency of, the claims are to be embraced as being within their scope.

The invention claimed is:

1. A method of synchronizing a digital transmission of analog modem signals, comprising:
    receiving, at a second modem, a first digital data signal from a first modem via a transmission medium, wherein:
        said first digital data signal is received serially, and
        said first digital data signal comprises a first sample clock signal, said first sample clock signal comprising a first start bit representing a delay;
    detecting said first start bit by said second modem;
    generating, by said second modem, a first recreation clock signal based on said first start bit, wherein said first recreation clock signal comprises said delay;
    converting said first digital data signal to a first analog signal by a first digital-to-analog converter;
    generating, by said second modem, a second analog signal, said second analog signal comprises a second sample clock signal, said second sample clock signal comprising a second start bit;
    converting, by a first analog-to-digital converter, said second analog signal to a second digital data signal; and
    transmitting, by said second modem, said second digital data signal to said first modem via said transmission medium.

2. A method of synchronizing the digital transmission of analog signals, as recited in claim 1, wherein said transmission medium is an A/C power line.

3. A method of synchronizing the digital transmission of analog signals, as recited in claim 1, wherein said transmission medium is an over the air RF signal.

4. A method of synchronizing a digital transmission of analog signals, as recited in claim 1, further comprising:
    receiving, at said first modem, said second digital data signal from said second modem;
    detecting said second start bit by said first modem;
    generating, by said first modem, a second recreation clock signal based on said second start bit, wherein said second recreation clock signal comprises said delay;
    converting said second digital data signal to a third analog signal by a second digital-to-analog converter;
    generating, by said first modem, a fourth analog signal said fourth analog signal comprises a first sample clock signal, said first sample clock signal comprising said first start bit;
    converting, by a second analog-to-digital converter, said fourth analog signal to a said first digital data signal; and
    transmitting, by said first modem, said first digital data signal to said second modem via said transmission medium.

* * * * *